Mar. 13, 1923.

P. M. JORGENSEN

QUACK GRASS DESTROYER

Filed May 18, 1922

1,448,121

INVENTOR
Peder M. Jorgensen
BY A. M. Carlsen
ATTORNEY.

Patented Mar. 13, 1923.

1,448,121

UNITED STATES PATENT OFFICE.

PEDER M. JORGENSEN, OF MILLTOWN, WISCONSIN.

QUACK-GRASS DESTROYER.

Application filed May 18, 1922. Serial No. 561,961.

*To all whom it may concern:*

Be it known that I, PEDER M. JORGENSEN, a citizen of the United States, residing at Milltown, in the county of Polk and State of Wisconsin, have invented certain new and useful Improvements in Quack-Grass Destroyers, of which the following is a specification.

This invention relates to quack grass destroyers and the object is to provide a comparatively simple but efficient machine of said kind.

Figure 1:
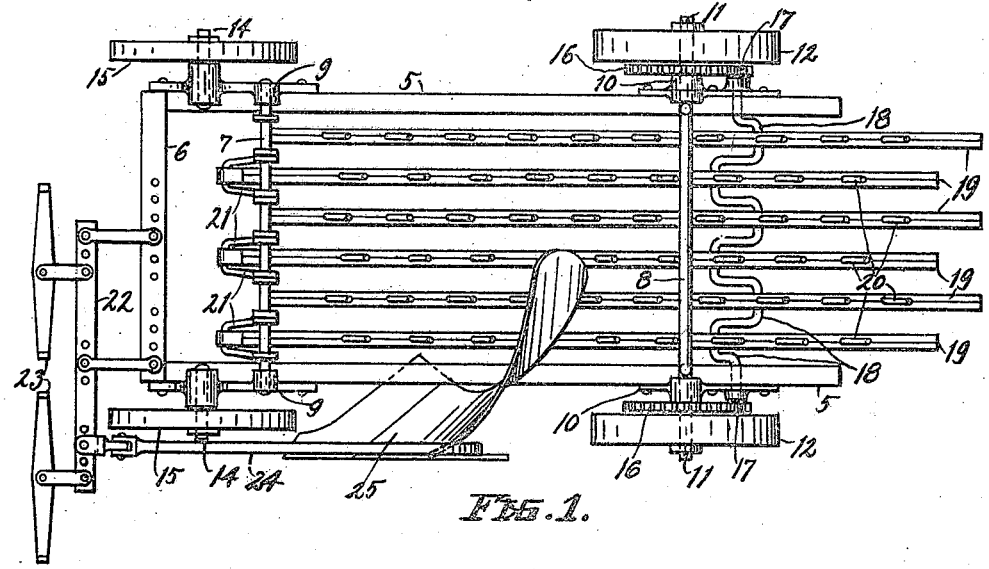
Fig. 1 is a top or plan view of my improved quack grass destroyer.
Figure 2:
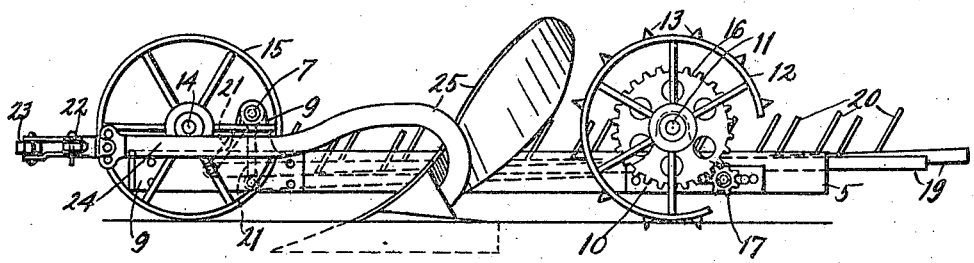
Fig. 2 is a side elevation of Fig. 1.

Referring to the drawing by reference numerals, the main frame is composed of angular side bars 5, a front cross bar 6 and two cross bars 7 and 8 secured in brackets 9 and 10 respectively. The rear bar 8 has its ends offset downwardly and formed into skeins 11 on which rotate the rear ground wheels 12 having lugs 13. The front bar 7 may also be offset to form skeins 14 for the front wheels 15 but, as shown, the skeins 14 may be short shafts fixed in the brackets 9.

Figures 3, 4:
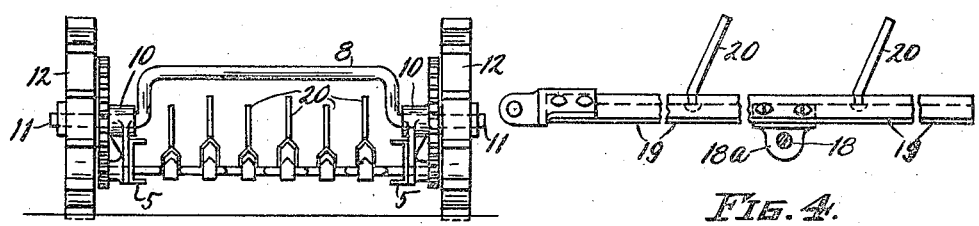
Fig. 3 is a rear end elevation of the machine with the plow omitted.
Fig. 4 is a side view of one of the shaker bars.

Secured to each rear wheel 12 is a gear 16 meshing with a pinion 17 fixed on a multiple crank shaft 18 journaled across the rear portion of the main frame 5. Engaged by the several cranks of shaft 18 is a series of boxes 18ª (see Fig. 4) fixed to a series of parallel shaker bars 19 each of which has its upper side provided with a series of upright rearwardly inclined fingers 20 and its front end pivotally attached to a stirrup 21 suspended from the bar 7.

Suitably connected to the front frame bar 6 is a draft bar 22 having draft appliances 23 for draft animals, or a tractor may be hitched to the draft bar.

Hitched to the draft bar 22 or any other suitable extension from the front part of the frame is the beam 24 of a plow 25, which is thus drawn along with the frame close by one side of it.

In the operation, when the machine is drawn forward over a field having quack grass, the plow takes up one furrow at a time and turns it laterally upon the bars 19, which being vibrated by the multiple crank shaft 18 at a considerable speed cause the furrow to be shattered and its dirt shaken down between the bars 19 while the fingers 20 move the quack grass and its roots rearward, depositing it on the ground, where it gets dry and is then raked into heaps and burned.

What I claim is:

1. In a quack grass destroyer, a skeleton frame mounted on ground wheels and adapted to be drawn forward, a multiple crank shaft journaled across the frame, a series of parallel spaced shaker bars having their front ends connected by stirrups and a cross bar to the skeleton frame and their rear portions operatively connected with the crank shaft, said crank shaft being operatively connected with one or more of the ground wheels by speed increasing means, and a plow arranged near one side of the skeleton frame so as to turn a furrow upon the shaker bars and having the front end of its beam operatively connected with the front end of the frame.

2. The structure specified in claim 1 the said operative connection between the plow and the frame comprising a draft bar secured to the frame and projecting laterally beyond the front end of the same and having draft appliances for hitching some motive power to it.

3. The structure specified in claim 1, said plow having its mold board projected considerably in over the shaker bars.

In testimony whereof I affix my signature.

PEDER M. JORGENSEN.